UNITED STATES PATENT OFFICE.

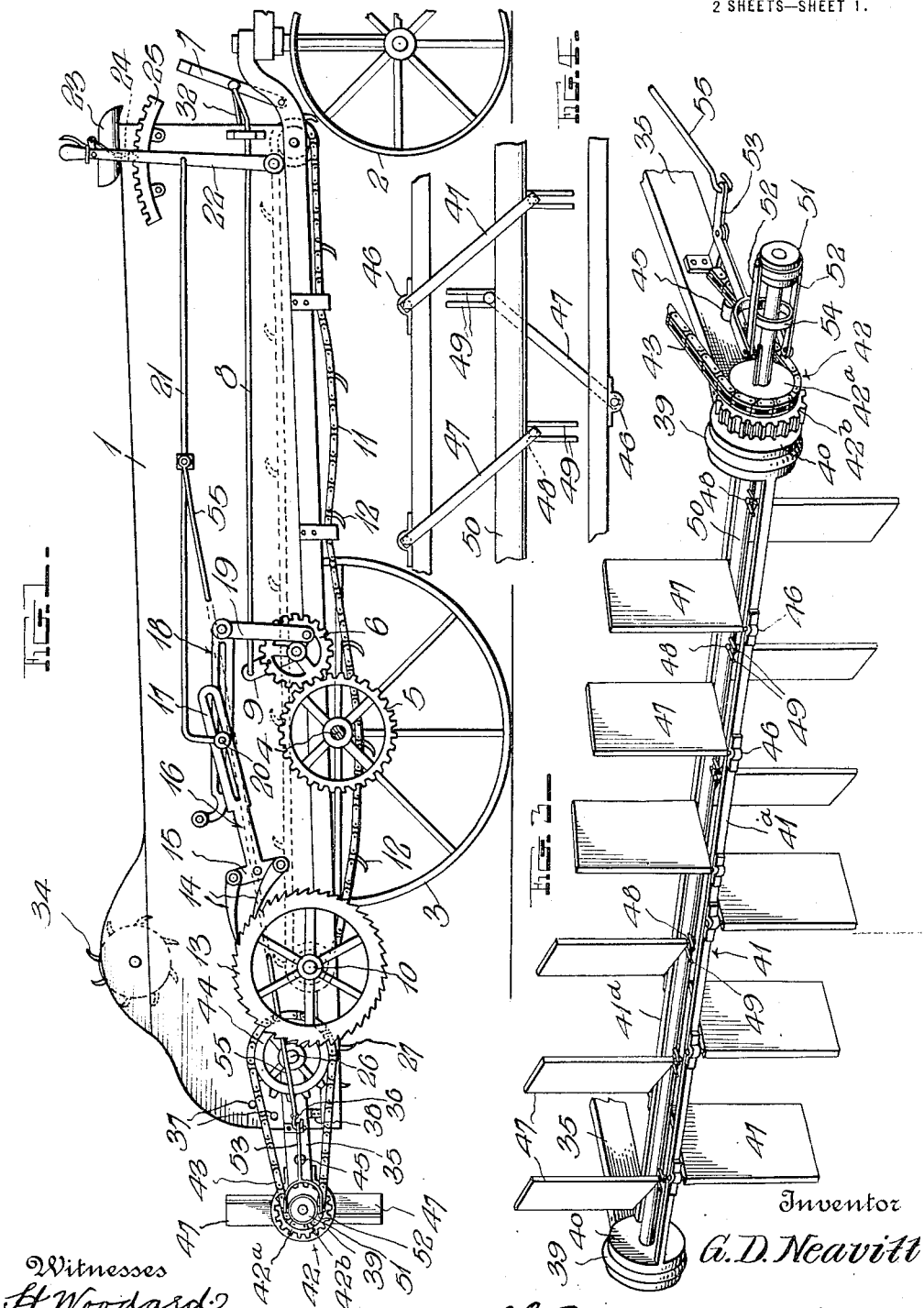

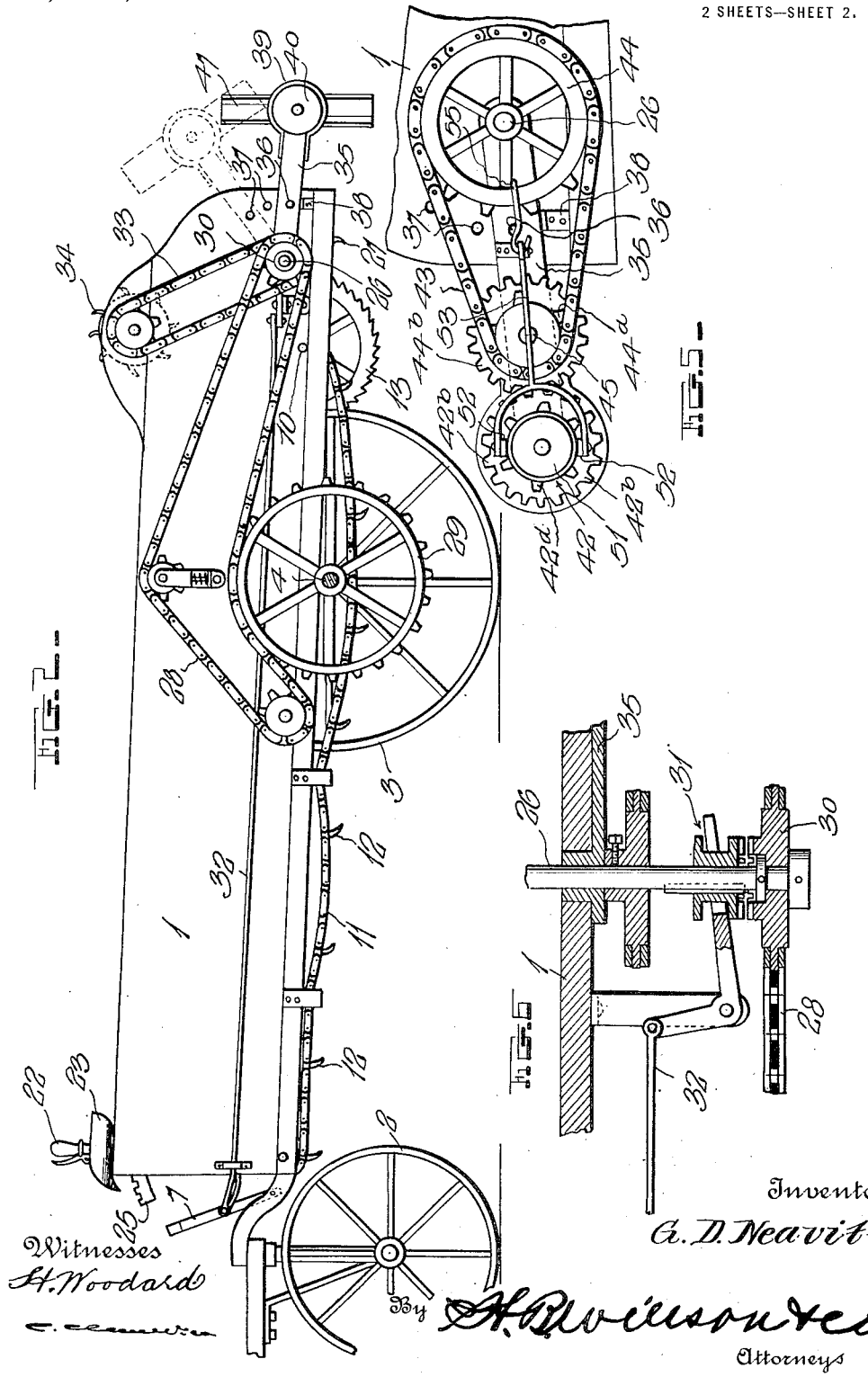

GEORGE D. NEAVITT, OF CENTERVILLE, MARYLAND.

MANURE-SPREADER.

1,203,389.   Specification of Letters Patent.   Patented Oct. 31, 1916.

Application filed May 7, 1915. Serial No. 26,553.

*To all whom it may concern:*

Be it known that I, GEORGE D. NEAVITT, a citizen of the United States, residing at Centerville, in the county of Queen Annes and State of Maryland, have invented certain Improvements in Manure-Spreaders.

My invention relates to improvements in manure spreaders and has for its object to provide improved means for distributing the manure in rows of any desired width, the width of spread being totally under the control of the operator from the usual seat at the front of the machine.

With this general object in view, the invention resides in certain novel features of construction and in unique combinations of parts to be hereinafter fully described and claimed, the descriptive matter being supplemented by the accompanying drawings wherein:

Figures 1 and 2 are side elevations disclosing opposite sides of the machine; Fig. 3 is a perspective view disclosing more particulary the construction of the distributer proper; Fig. 4 is an edge view of a portion of said distributer; Fig. 5 is a detail side elevation showing the manner of reversing the distributer, and Fig. 6 is a detail horizontal section showing more particularly a clutch to be described.

In these drawings, similar reference characters designate corresponding parts throughout the several views, the numeral 1 having reference to the body of the spreader which is supported in the usual manner upon front and rear wheels 2 and 3, the latter driving the rear axle 4 upon the right hand end of which a gear 5 is keyed, said gear being normally in mesh with an additional gear 6 mounted shiftably upon the body 1 and capable of being thrown into and out of mesh with gear 5 by a foot lever 7 disposed in advance of the body and having a rod 8 leading rearwardly to the shifting device of gear 6, such device being preferably in the form of a lever 9 fulcrumed between its ends, having connection with the rod 8 at one end, and carrying the shaft of the gear 6 at its other end.

Disposed near the rear end of the body 1 is a transverse shaft 10 around which and an additional shaft at the front of the body 1, an endless feed apron 11 travels, the slats of said apron being preferably provided with prongs 12 for engaging the body of manure to feed the same rearwardly. The right hand end of the shaft 10 is equipped with a ratchet wheel 13 with which a pair of pawls 14 coöperate, said pawls being carried by the approximately upright head 15 of a T-shaped lever 16 whose shank 17 is provided with an elongated slot registering with a similar slot in a lever 18. The lever 16 is fulcrumed at the juncture of its head and shank, while the fulcrum of the lever 18 is disposed at the rear end thereof. The front end of the last-named lever is connected by a link 19 to a crank pin carried by the gear 6, whereby as said gear is rotated, the lever in question will be oscillated vertically, this movement being transmitted to the lever 16 to actuate the pawls 14, by a slide 20 in the form of a pin passing through the registering slots in the two levers, said slide being shiftable longitudinally within the slots by the provision of a rod 21 connected thereto at its rear end and pivoted at its front end to an upright lever 22 adjacent the driver's seat 23, said lever being equipped with a pawl 24 coacting with a segment 25, whereby it may be locked against movement in any one of its positions.

By shifting the slide 20 in a proper direction, the amount of movement of the pawls 14 may be varied, thereby varying the speed at which the apron 11 is driven, and thus controlling the amount of fertilizer fed rearwardly thereby.

Disposed immediately in rear of the shaft 10, is a main beater shaft 26 carrying an appropriate transverse rotary beater 27, said shaft being driven by a chain 28 from a gear 29 on the left hand end of the axle 4. The sprocket 30 on the shaft 26 and around which the chain passes, is loose on said shaft and may be locked thereto or disengaged therefrom by the provision of an appropriate clutch 31, preferably by the foot lever 7 through the instrumentality of a longitudinal rod 32 connecting said clutch and the lever. Thus it will be evident that when the lever in question is forced forwardly, the drive to the beater shaft 26 will be discontinued and the gears 5 and 6 will be simultaneously thrown out of mesh.

Disposed above the shaft 26 and driven therefrom by the sprocket chain 33, is an upper beater 34, the construction of this beater as well as the construction of most parts heretofore described being of any preferred formation for accomplishing the desired results. It is essential, however, as will be hereinafter brought out, that some mechanism be provided for varying the speed of the apron 11 and that such mechanism be provided with an operating member disposed adjacent the driver's seat.

Having their front ends mounted loosely on the projecting ends of the shaft 26, is a pair of approximately horizontal arms 35 which extend rearwardly beyond the body 1 and are shiftable arcuately around the shaft 26 to a number of positions, being held normally against movement by bolts 36 passing through arcuate series of openings 37 in the sides of said body. If desired, the arms 35 may rest on supports 38 when at their limit of downward movement.

The rear ends of the arms 35 are equipped with any preferred type of bearing 39 in which cylindrical heads 40 are rotatably mounted, said heads constituting the ends of a shaft like supporting member 41 which extends transversely of the rear end of the machine and comprises said heads and a pair of parallel bars 41ª secured at their opposite ends to said heads and spaced on diametrically opposite sides of the axis thereof.

One head 40 is equipped with a combined gear and sprocket 42, the sprocket 42ª of which is normally driven by a chain 43 from a sprocket 44 keyed to the right hand end of the main beater shaft 26. However, when the direction of rotation of the member 41 is to be reversed for reasons yet to become obvious, an additional combined gear and sprocket 44 (see Fig. 5) is rotatably mounted on a stub shaft 45 carried by the right hand arm 35, the sprocket 44ª of the device 44 being then driven by the chain 43 which is shortened for the purpose, while the gear 44ᵇ of the aforesaid device 44 meshes with the gear 42ᵇ of the member 42. Thus is will be obvious that the rotation of the member 41 may be reversed when desired.

Pivotally connected at one corner to the bars 41ª as disclosed at 46, is a plurality of preferably rectangular paddles which extend in opposite directions from the member 41, the paddles to one side of said member being pitched oppositely to those of the other, while the series of paddles at opposite ends of said member are similarly related. The paddles 47 are provided with inwardly extending crank pins 48 at points spaced from their pivots, said pins being received between pairs of stops 49 which project in diametrically opposite directions from a shaft 50 which is slidable axially through the heads 40, being disposed centrally between the two bars 41ª. Thus it will be seen that when said shaft is shifted endwise in one direction or the other, the angular relation of the paddles 47 will be varied.

For shifting the shaft 50 in the necessary manner, a collar 51 is swiveled to one end thereof and is connected by links 52 with a fork carried by one end of a bell crank lever 53, the two links being preferably spaced by a ring 54 which loosely surrounds one end of the shaft 50. Leading from the other end of the bell crank 53 to an appropriate point on the rod 21 at which point it is connected to said rod, is a rod 55. By this arrangement of parts, operation of the lever 22 will vary the angular relation of the paddles 47, thus readily controlling the width of spread of the machine, and will simultaneously vary the speed of the apron 11. This is essential, since when the machine is spreading wide strips of land, more fertilizer must be delivered to the distributing mechanism than when spreading narrow strips, provided both wide and narrow strips are to be of the same thickness and density. It is thus evident that it is a highly advantageous feature to increase the speed of the apron proportionately with increasing the width of spread, and similarly to decrease the speed of such apron when the machine is spreading narrow strips.

By raising the arms 35 to approximately the dotted line position shown in Fig. 2 or to an intermediate position, and by reversing the direction of movement of the shaft member 41, in the manner before described, the manure may be thrown directly downward with great force in any widths controllable by the lever 22. By delivering the manure in this manner, side winds will not affect the spreading thereof in any manner whatsoever.

From the above description, taken in connection with the accompanying drawings, the construction and manner of operation of the invention will be readily understood without requiring a more extended explanation.

In the drawings, certain specific details of construction have been shown for accomplishing probably the best results, and in the preceding, such details have been described, but obviously I need not be restricted thereto otherwise than to the extent to which the appended claims limit me.

I claim:

1. A manure spreader having at its rear end a rotary distributer comprising a transverse rotating shaft-like member, and a plurality of paddles radiating therefrom and shiftable to various angles in respect to their directions of travel.

2. A manure spreader having at its rear end a rotary distributer comprising a rotatable shaft-like member, a plurality of pivotally mounted paddles radiating from said member and shiftable to various angles in respect to their directions of travel, and means for locking said paddles in adjusted positions.

3. A manure spreader having at its rear end a transverse rotary distributer comprising a rotating shaft-like member of openwork formation, a plurality of pivotally mounted paddles radiating from the aforesaid member, and a manually shiftable shaft having eccentric pivotal connections with the paddles.

4. A manure spreader having at its rear end a transverse shaft-like member including a pair of spaced axially alined heads, a pair of spaced bars connecting said heads and disposed on diametrically opposite sides of the axis thereof, a plurality of radiating paddles pivoted at their inner ends to the aforesaid bars and having portions disposed immediately adjacent the aforesaid axis, a longitudinally shiftable shaft slidable through the pair of heads at the axis thereof, pivotal connections between the paddles and said shaft, and means for shifting the aforesaid shaft.

5. A manure spreader having means for spreading manure at various widths, means for feeding manure to the spreading means, and controlling means for varying the width of spread and the quantity of feed simultaneously.

6. A manure spreader comprising a distributer having parts adjustable in respect to each other for spreading at various widths, and variable speed feeding means for said distributer respectively increased and decreased proportionately in speed as the distributer is adjusted for wide and narrow spreading.

7. A manure spreader comprising a distributer adjustable for spreading at various widths, a variable speed feeding means for said distributer, and a single control for simultaneously and proportionately increasing the speed of the feeding means and adjusting the distributer for wide spreading, and vice versa.

8. A manure spreader having at its rear end a distributer adjustable for spreading at various widths, a lever at the front of the machine for adjusting said distributer, a feed member for delivering manure to the distributer, and means for driving the feed member at a number of speeds and including a control member having connection with the aforesaid lever.

9. A manure spreader comprising means for spreading at various widths, and means for feeding the material to the spreading means in a greater or less quantity, the two being jointly and proportionately adjustable from a single control to permit a spread of uniform density regardless of the width thereof.

10. In a manure spreader, a bladed distributer, the blades being angularly adjustable to vary the width of spread, means for presenting manure to said distributer, and means for controlling the angular adjustment of the distributer blades and the speed of manure presentation, so that the spread of manure is maintained at a uniform density regardless of the width of spread.

In testimony whereof I affix my signature.

GEORGE D. NEAVITT.